United States Patent
Wang et al.

(10) Patent No.: US 10,630,168 B1
(45) Date of Patent: Apr. 21, 2020

(54) BRIDGELESS POWER FACTOR CORRECTION CONVERTER WITH ZERO CURRENT DETECTION CIRCUIT

(71) Applicant: NXP USA, INC., Austin, TX (US)

(72) Inventors: Lingling Wang, Shanghai (CN); Wanfu Ye, Shanghai (CN); Kai-wen Cheng, Taipei (TW)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/438,449

(22) Filed: Jun. 11, 2019

(30) Foreign Application Priority Data

May 27, 2019 (CN) .......................... 2019 1 0443202

(51) Int. Cl.
  *H02M 1/42* (2007.01)
  *H02M 1/08* (2006.01)
  *H02M 1/00* (2006.01)

(52) U.S. Cl.
  CPC ......... *H02M 1/4208* (2013.01); *H02M 1/083* (2013.01); *H02M 1/4233* (2013.01); *H02M 2001/0009* (2013.01); *H02M 2001/0058* (2013.01)

(58) Field of Classification Search
  CPC ....... H02M 1/4233; H02M 2001/0058; H02M 2001/0009
  See application file for complete search history.

(56) References Cited

U.S. PATENT DOCUMENTS

| | | | | |
|---|---|---|---|---|
| 4,565,957 A | * | 1/1986 | Gary | H02P 1/50 318/722 |
| 5,844,193 A | * | 12/1998 | Nomura | B23K 11/24 219/110 |
| 9,189,004 B2 | | 11/2015 | Jin et al. | |
| 9,570,973 B2 | | 2/2017 | Chen et al. | |
| 9,899,909 B2 | | 2/2018 | Lin et al. | |
| 10,461,628 B1 | * | 10/2019 | Wang | H02M 1/083 |
| 2009/0027925 A1 | * | 1/2009 | Kanouda | H02M 1/4233 363/21.13 |
| 2012/0014149 A1 | * | 1/2012 | Usami | H02M 7/217 363/84 |
| 2012/0051107 A1 | * | 3/2012 | Choi | H02M 1/4208 363/126 |
| 2012/0293141 A1 | * | 11/2012 | Zhang | H02M 1/4233 323/207 |
| 2013/0249504 A1 | * | 9/2013 | Hsu | H02M 1/4225 323/207 |

(Continued)

FOREIGN PATENT DOCUMENTS

WO 2017174138 A1 10/2017

*Primary Examiner* — Yusef A Ahmed
*Assistant Examiner* — Ishrat F Jamali

(57) ABSTRACT

A critical conduction mode (CRM) bridgeless PFC system includes a PFC converter connected to an Alternating Current (AC) source, a zero-current detection (ZCD) circuit for detecting a zero-current state of the PFC converter, a zero-voltage switching (ZVS) detection circuit, and a processor. Voltage divider circuits receive a first voltage and a supply voltage from the PFC converter and the AC source. The ZCD circuit receives divided voltages generated by the voltage divider circuits and generates a ZCD signal. The ZCD signal is used by the ZVS detection circuit to generate a ZVS flag, which is used by the processor to control switching of first through fourth transistors of the PFC converter.

19 Claims, 7 Drawing Sheets

(56) References Cited

U.S. PATENT DOCUMENTS

| | | | |
|---|---|---|---|
| 2014/0035541 A1* | 2/2014 | Jin | G05F 1/70 |
| | | | 323/210 |
| 2014/0355319 A1 | 12/2014 | Cohen | |
| 2015/0180330 A1 | 6/2015 | Ye et al. | |
| 2016/0134185 A1* | 5/2016 | Wang | H02M 1/42 |
| | | | 323/235 |
| 2018/0123457 A1* | 5/2018 | Yaguchi | H02M 1/32 |
| 2019/0036440 A1 | 1/2019 | Ma et al. | |
| 2019/0199203 A1* | 6/2019 | Viswanathan | H02M 1/4208 |
| 2019/0260290 A1* | 8/2019 | Maejima | H02M 1/4225 |

* cited by examiner

US 10,630,168 B1

BRIDGELESS POWER FACTOR CORRECTION CONVERTER WITH ZERO CURRENT DETECTION CIRCUIT

BACKGROUND

The present invention relates generally to electronic circuits, and, more particularly, to a bridgeless power factor correction converter.

A power factor of an electrical circuit is determined using a ratio of real power to apparent power, where the real power is associated with a load of the electrical circuit, and the apparent power is the power supplied to the electrical circuit. The power factor is indicative of the efficiency of the circuit. An efficient circuit will have a power factor in the range of 0.8-1, where 1 is ideal.

Today's power supplies often include a power factor correction (PFC) converter in order to improve the efficiency of the power supply. One example of a PFC circuit is a critical conduction mode (CRM) totem-pole bridgeless PFC circuit. This circuit includes a zero-current detection (ZCD) circuit and a bridgeless PFC converter. The bridgeless PFC converter includes transistors in a totem-pole arrangement and an inductor. A power factor close to unity is achieved by carefully controlling the switching of the transistors. The transistors are switched based on a detection of a zero-current state across the inductor by the ZCD circuit.

The ZCD circuit uses auxiliary windings to detect the zero-current state based on a voltage induced in the auxiliary windings. However, the induced voltage is bipolar, so a rectification circuit is needed to detect the induced bipolar voltage. A sampling circuit also is required to sample voltages used for detecting the zero-current state. The sampling circuit and the rectification circuit increase the area required by the ZCD circuit and thus by the bridgeless PFC system.

Other implementations of the ZCD circuit include current transformer (CT) sensors that detect the zero-current state. However, using multiple CT sensors increases area as well as power consumption. In addition, other bridgeless PFC systems may include additional hardware circuitry or use software-based methods for controlling the bridgeless PFC converter. However, accuracy issues are prevalent. Thus, there is still is room for improvement in CRM bridgeless PFC systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
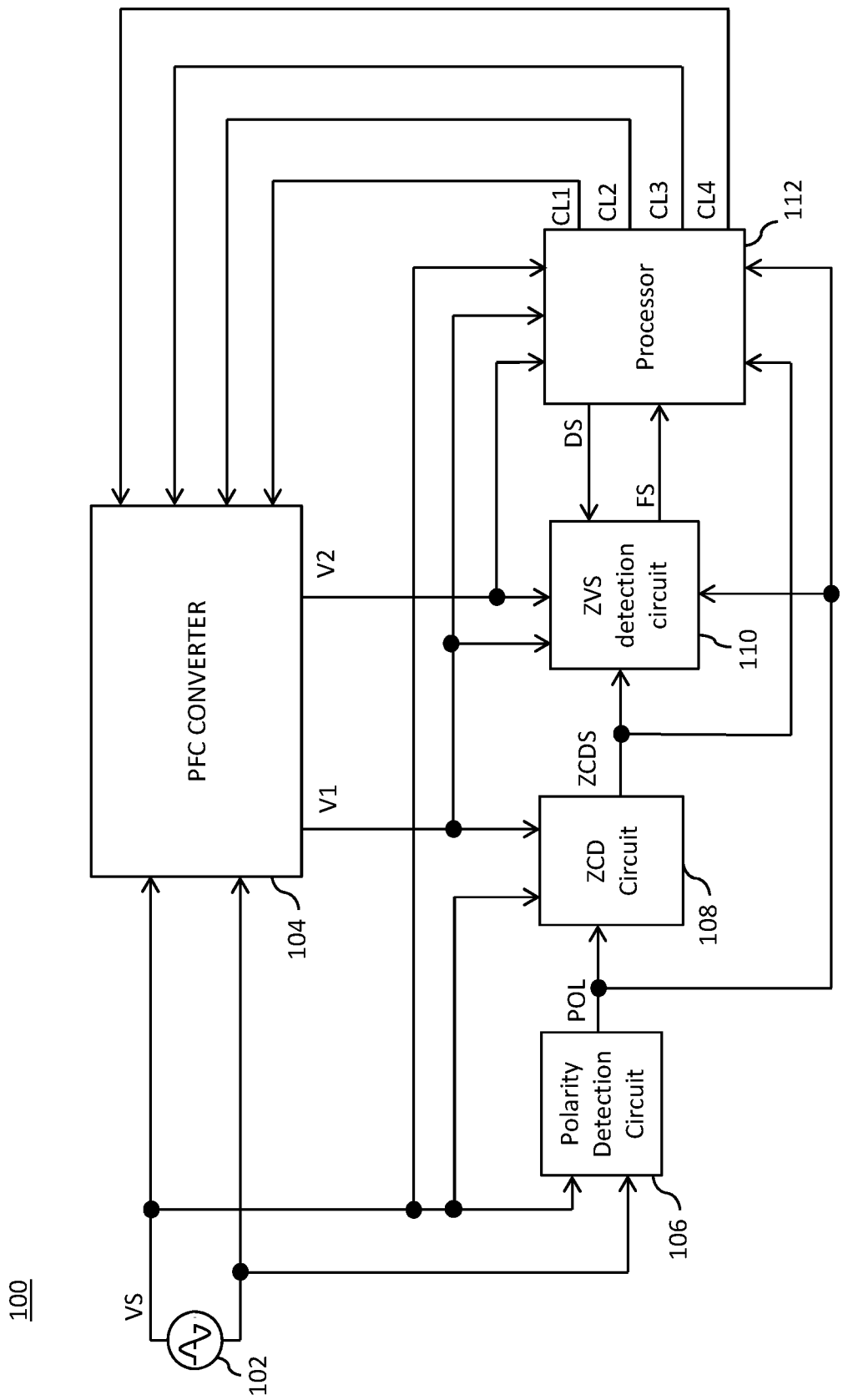
FIG. 1 is a schematic block diagram of a critical conduction mode (CRM) bridgeless power factor correction (PFC) system in accordance with an embodiment of the present invention.

The detailed description of the appended drawings is intended as a description of the currently preferred embodiments of the present invention and is not intended to represent the only form in which the present invention may be practiced. It is to be understood that the same or equivalent functions may be accomplished by different embodiments that are intended to be encompassed within the spirit and scope of the present invention.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transmission of electrical signals.

In an embodiment, the present invention provides a critical conduction mode (CRM) bridgeless power factor correction (PFC) system that includes a bridgeless PFC converter, a zero-current detection (ZCD) circuit, a zero-voltage switching (ZVS) detection circuit, and a processor. The bridgeless PFC converter receives a supply voltage and outputs first and second voltages. The ZCD circuit is connected to the bridgeless PFC converter and includes first and second voltage divider circuits, first and second comparators, and a selecting circuit. The first voltage divider circuit receives the supply voltage and outputs a third voltage. The second voltage divider circuit is connected to the bridgeless PFC converter for receiving the first voltage, and outputting a fourth voltage. The first and second comparators are connected to the first and second voltage divider circuits for receiving the third and fourth voltages, and outputting first and second comparison signals, respectively. The selecting circuit is connected to the first and second comparators for receiving the first and second comparison signals, respectively, and outputting a ZCD signal. The ZCD signal is indicative of a zero-current state of the bridgeless PFC converter. The ZVS detection circuit is connected to the bridgeless PFC converter for receiving the first and second voltages, and the ZCD circuit for receiving the ZCD signal. The ZVS detection circuit outputs a ZVS flag signal. The processor is connected to the ZCD circuit and the ZVS detection circuit for receiving the ZCD signal and the ZVS flag signal, respectively, and the bridgeless PFC converter for receiving the first and second voltages, and outputting a set of control signals for controlling the bridgeless PFC converter.

In another embodiment, the present invention provides a ZCD circuit for a PFC converter. The ZCD circuit includes first and second voltage divider circuits, first and second comparators, and a selecting circuit. The first voltage divider circuit receives a supply voltage and outputs a first voltage. The second voltage divider circuit is connected to a bridgeless PFC converter for receiving a second voltage, and outputting a third voltage. The first and second comparators are connected to the first and second voltage divider circuits for receiving the first and third voltages, and outputting first and second comparison signals, respectively. The selecting circuit is connected to the first and second comparators for receiving the first and second comparison signals and outputting a ZCD signal. The ZCD signal is indicative of a zero-current state of the bridgeless PFC converter.

Various embodiments of the present invention provide a CRM bridgeless PFC system. The CRM bridgeless PFC system includes a ZCD circuit for detecting a zero-current state of a bridgeless PFC converter of the CRM bridgeless PFC system. The PFC converter outputs first and second voltages. The ZCD circuit is connected to the bridgeless PFC converter and an AC source for receiving the first voltage and a supply voltage, respectively. The ZCD circuit outputs a ZCD signal based on the first voltage and the supply voltage. The ZCD signal also is used by a ZVS detection circuit for generating a ZVS flag signal FS. A processor receives the supply voltage, the first and second voltages, the ZCD signal, and the ZVS flag signal and generates a set of control signals that are used to control the PFC converter.

The CRM bridgeless PFC system eliminates the need for implementing additional hardware (such as rectification circuitry, sampling circuitry, and multiple CT sensors) to detect the zero-current state, thereby reducing the area required by the ZCD circuit. The space occupied by the PFC system, the cost of the PFC system, and the power consumed by the PFC system all are improved compared to conventional CRM bridgeless PFC systems. Further, the ZCD signal acts as a timing control signal for the generation of the ZVS flag signal in real-time. Thus, the accuracy and reliability of controlling the PFC system is improved as compared to conventional bridgeless PFC systems.

Referring now to FIG. 1, a block diagram of a CRM bridgeless PFC system 100 in accordance with an embodiment of the present invention is shown. The PFC system 100 includes an AC (Alternating Current) source 102, a bridgeless PFC converter 104, a polarity detection circuit 106, a zero-current detection (ZCD) circuit 108, a zero-voltage switching (ZVS) detection circuit 110, and a processor 112. The AC source 102 outputs an AC voltage, i.e., a supply voltage VS.

The PFC converter 104 is connected to the AC source 102 for receiving the supply voltage VS. The PFC converter 104 also receives first through fourth control signals CL1-CL4 (hereinafter referred to as a "set of control signals CL1-CL4") from the processor 112. The PFC converter 104 converts the supply voltage VS to first and second DC (Direct Current) output voltages V1 and V2.

The polarity detection circuit 106 is connected to the AC source 102 for receiving the supply voltage VS. The polarity detection circuit 106 outputs a polarity signal POL that indicates positive or negative half-cycles of the supply voltage VS. In one embodiment, during the positive and negative half-cycles, the polarity detection circuit 106 generates the polarity signal POL at logic high and logic low states, respectively. In another embodiment, during the positive and negative half-cycles, the polarity detection circuit 106 generates the polarity signal POL at logic low and logic high states, respectively.

The ZCD circuit 108 is connected to the AC source 102, the bridgeless PFC converter 104, and the polarity detection circuit 106 for receiving the supply voltage VS, the first voltage V1, and the polarity signal POL, respectively. The ZCD circuit 108 outputs a ZCD signal ZCDS that indicates a zero-current state of the PFC converter 104. During the positive half-cycle, the ZCD signal ZCDS is activated when the first voltage V1 is less than the supply voltage VS. During the negative half-cycle, the ZCD signal ZCDS is activated when the first voltage V1 is greater than the supply voltage VS.

The ZVS detection circuit 110 is connected to the bridgeless PFC converter 104, the polarity detection circuit 106, and the ZCD circuit 108 for receiving the first and second voltages V1 and V2, the polarity signal POL, and the ZCD signal ZCDS, respectively. The ZVS detection circuit 110 further receives a delay signal DS from the processor 112. The ZVS detection circuit 110 outputs a ZVS flag signal FS. During the positive half-cycle, the ZVS flag signal FS is activated (i.e., the ZVS flag signal FS is at a logic high state) when the ZCD signal ZCDS is activated and the first voltage V1 is less than a first threshold voltage Vth1 (shown in FIG. 6). The processor 112 determines a value of the first threshold voltage Vth1, which is used for determining whether an ideal switching condition for valley switching of the first and second control signals CL1 and CL2 has been achieved. During the negative half-cycle, the ZVS flag signal FS is activated when the ZCD signal ZCDS is activated and the first voltage V1 is greater than the second voltage V2.

The processor 112 is connected to the ZVS detection circuit 110 for receiving the ZVS flag signal FS. The processor 112 also is connected to the AC source 102, the PFC converter 104, the polarity detection circuit 106, and the ZCD circuit 108 for receiving the supply voltage VS, the first and second voltages V1 and V2, the polarity signal POL, and the ZCD signal ZCDS, respectively. The processor 112 generates the set of control signals CL1-CL4, which are used to control the PFC converter 104. The processor 112 also generates the delay signal DS, which is used to control the ZVS detection circuit 110.

Figure 2:
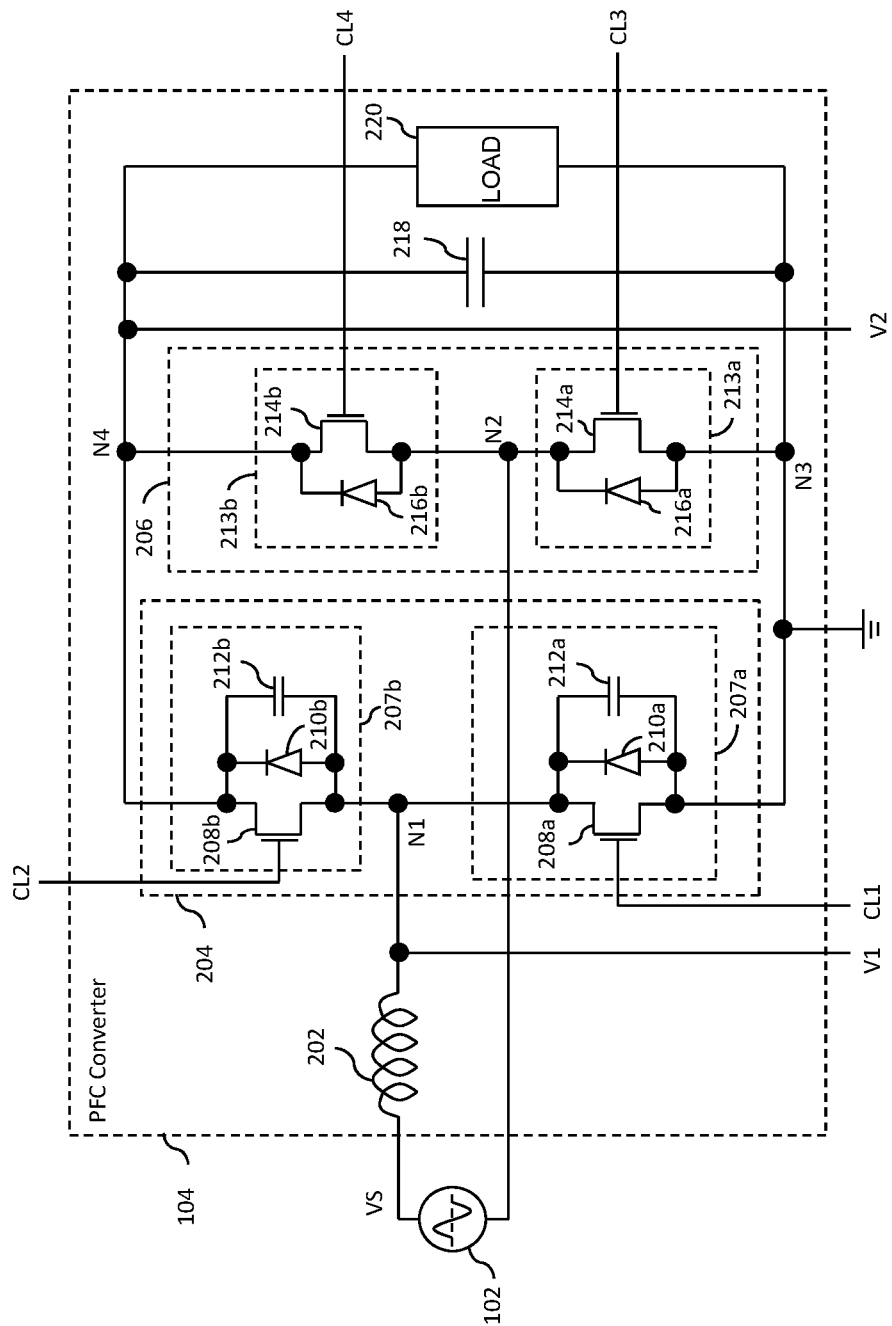
FIG. 2 is a schematic circuit diagram of a bridgeless PFC converter of the CRM bridgeless PFC system of FIG. 1 in accordance with an embodiment of the present invention.

Referring now to FIG. 2, a circuit diagram of the PFC converter 104 in accordance with an embodiment of the present invention is shown. The bridgeless PFC converter 104 includes an inductor 202, and first and second bridge arms 204 and 206 which are connected in parallel.

The inductor 202 has a first terminal connected to the AC source 102 for receiving the supply voltage VS and a second terminal that outputs the first voltage V1.

The first bridge arm 204 includes first and second switches 207a and 207b connected in series with a first node N1 between the switches 207a and 207b. The first and second switches 207a and 207b include first and second series connected transistors 208a and 208b. The second terminal of the inductor 202 also is connected to the first node N1. The first switch 207a further includes a first body diode 210a and a first body capacitor 212a. Similarly, the second switch 207b includes a second body diode 210b and a second body capacitor 212b. The first body diode 210a and the first body capacitor 212a are coupled in parallel to the first transistor 208a. Similarly, the second body diode 210b and the second body capacitor 212b are coupled in parallel to the second transistor 208b.

The second bridge arm 206 includes third and fourth series connected switches 213a and 213b, and there is a second node N2 located between the switches 213a and 213b. The first and second switches 213a and 213b include third and fourth transistors 214a and 214b, respectively, that are connected in series. The AC source 102 also is connected to the second node N2. The third and fourth transistors 214a and 214b are connected to the first and second transistors 208a and 208b at third and fourth nodes N3 and N4, respectively. The third node N3 also is connected to ground. The third and fourth switches 213a and 213b include third and fourth body diodes 216a and 216b, respectively. The third and fourth body diodes 216a and 216b are coupled in parallel to the third and fourth transistors 214a and 214b, respectively.

The PFC converter 104 further includes a first capacitor 218 and a load 220 that each are connected between the third and fourth nodes N3 and N4 such that they are connected in parallel with the first and second bridge arms 204 and 206.

The first transistor 208a has first and second terminals connected to the first and third nodes N1 and N3, respectively. During the positive half-cycle, the first and second terminals of the first transistor 208a are drain and source terminals, respectively, while during the negative half-cycle, the first and second terminals are source and drain terminals, respectively. The first transistor 208a further has a gate terminal connected to the processor 112 for receiving the first control signal CL1. The second transistor 208b has first and second terminals connected to the first and fourth nodes N1 and N4, respectively. During the positive half-cycle, the first and second terminals of the second transistor 208b are drain and source terminals, respectively, and during the negative half-cycle, the first and second terminals of the second transistor 208b are source and drain terminals, respectively. The gate of the second transistor 208b is connected to the processor 112 for receiving the second control signal CL2.

The third transistor 214a has first and second terminals connected to the second and third nodes N2 and N3, respectively. During the positive half-cycle, the first and second terminals are drain and source terminals, respectively, and during the negative half-cycle, the first and second terminals are source and drain terminals, respectively. The gate of the third transistor 214a is connected to the processor 112 for receiving the third control signal CL3. The fourth transistor 214b has first and second terminals connected to the second and fourth nodes N2 and N4, respectively. During the positive half-cycle, the first and second terminals are drain and source terminals, respectively, and during the negative half-cycle, the first and second terminals are source and drain terminals, respectively. The gate of the fourth transistor 214b is connected to the processor 112 for receiving the fourth control signal CL4.

The first through fourth transistors 208a, 208b, 214a and 214b are controlled by the set of control signals CL1-CL4. In one embodiment, the first through fourth transistors 208a, 208b, 214a, and 214b are activated when the set of control signals CL1-CL4 are activated, respectively. In another embodiment, the first through fourth transistors 208a, 208b, 214a, and 214b are activated when the set of control signals CL1-CL4 are deactivated, respectively.

The first transistor 208a functions as an active switch and a free-wheeling switch in the positive and negative half-cycles, respectively, and the second transistor 208b functions as a free-wheeling switch and an active switch in the positive and negative half-cycles, respectively. In one embodiment, the first and second transistors 208a and 208b are gallium nitride (GaN) high electron mobility transistors (HEMT) and the third and fourth transistors 214a and 214b are silicon transistors. During the positive half-cycle of VS, the first and third transistors 208a and 214a are activated and the second and fourth transistors 208b and 214b are deactivated when the inductor 202 is charging, and the second and third transistors 208b and 214a are activated and the first and fourth transistors 208a and 214b are deactivated when the inductor 202 is discharging. Further, during the negative half-cycle, the second and fourth transistors 208b and 214b are activated and the first and third transistors 208a and 214a are deactivated when the inductor 202 is charging, and the first and fourth transistors 208a and 214b are activated and the second and third transistors 208b and 214a are deactivated when the inductor 202 is discharging.

Figure 3A:
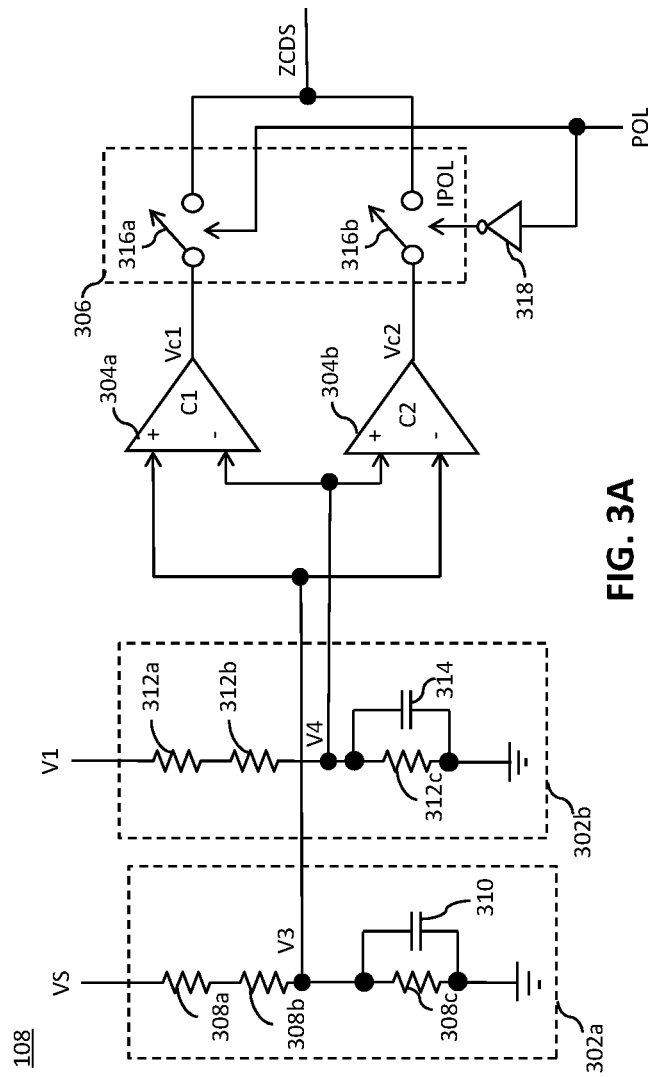
FIG. 3A is a schematic circuit diagram of a zero-current detection (ZCD) circuit of the CRM bridgeless PFC system of FIG. 1 in accordance with an embodiment of the present invention.

Referring now to FIG. 3A, a circuit diagram of the ZCD circuit 108 in accordance with an embodiment of the present invention is shown. The ZCD circuit 108 includes first and second voltage divider circuits 302a and 302b, first and second comparators 304a and 304b, and a first selecting circuit 306.

The first voltage divider circuit 302a includes first through third series connected resistors 308a-308c. The first resistor 308a has a first terminal connected to the AC source 102 for receiving the supply voltage VS. The second resistor 308b is connected between the first and third resistors 308a and 308c, and the third resistor 308c is connected between the second resistor 308b and ground. There is a first voltage tap between the second and third resistors 308b and 308c. A second capacitor 310 is connected in parallel to the third resistor 308c. The first voltage divider circuit 302a outputs a third voltage V3 at the first voltage tap.

The second voltage divider circuit 302b includes fourth through sixth resistors 312a-312c that are connected in series between the first node (where the first voltage V1 is generated) and ground. More particularly, the fourth resistor 312a has a first terminal connected to the second terminal of the inductor 202 for receiving the first voltage V1. The fifth resistor 312b is connected between the fourth and sixth resistors 312a and 312c, and the sixth resistor 312c is connected between the fifth resistor 312b and ground. A fourth voltage V4 is output from a second voltage tap located between the fifth and sixth resistors 312b and 312c. A third capacitor 314 is connected in parallel with the sixth resistor 312c.

Noninverting and inverting (positive and negative) input terminals of the first comparator 304a receive the third and fourth voltages V3 and V4 from the first and second taps of the first and second voltage dividers 302a and 302b. The first comparator 304a outputs a first comparison signal Vc1. In one embodiment, the first comparator 304a outputs the first comparison signal Vc1 at logic low and high states when the fourth voltage V4 is greater and less than the third voltage V3, respectively.

Noninverting and inverting (positive and negative) Noninverting and inverting (positive and negative) input terminals of the second comparator 304b receive the fourth and third voltages V4 and V3, respectively. The second comparator 304b outputs a second comparison signal Vc2. In one embodiment, the second comparison signal Vc2 is high when the fourth voltage V4 is greater than the third voltage V3, and Vc2 is low when the V4 is less than V3.

The first selecting circuit 306 includes first and second switches 316a and 316b having first terminals that are connected to the output terminals of the first and second comparators 304a and 304b for receiving the first and second comparison signals Vc1 and Vc2, respectively.

The ZCD circuit 108 further includes a first logic gate 318 that is connected to the polarity detection circuit 106 for receiving the polarity signal POL and generating/POL. In one embodiment, the first logic gate 318 is a NOT gate. The first logic gate 318 thus outputs an inverted version of the polarity signal IPOL (hereinafter referred to simply as "IPOL"). The first and second switches 316a and 316b have control terminals that are connected to the polarity detection circuit 106 and the first logic gate 318 for receiving POL and IPOL, respectively, for controlling a switching operation of the first and second switches 316a and 316b. Thus, the first and second switches 316a and 316b are activated in the positive and negative half-cycles, respectively. Second terminals of the first and second switches 316a and 316b are connected together and the ZCD signal is provided for outputting the ZCD signal at such connection. When the first and second switches 316a and 316b are activated during the positive and negative half-cycles, the first selecting circuit 306 outputs the ZCD signal ZCDS as the first and second comparison signals Vc1 and Vc2, respectively.

Figure 3B:
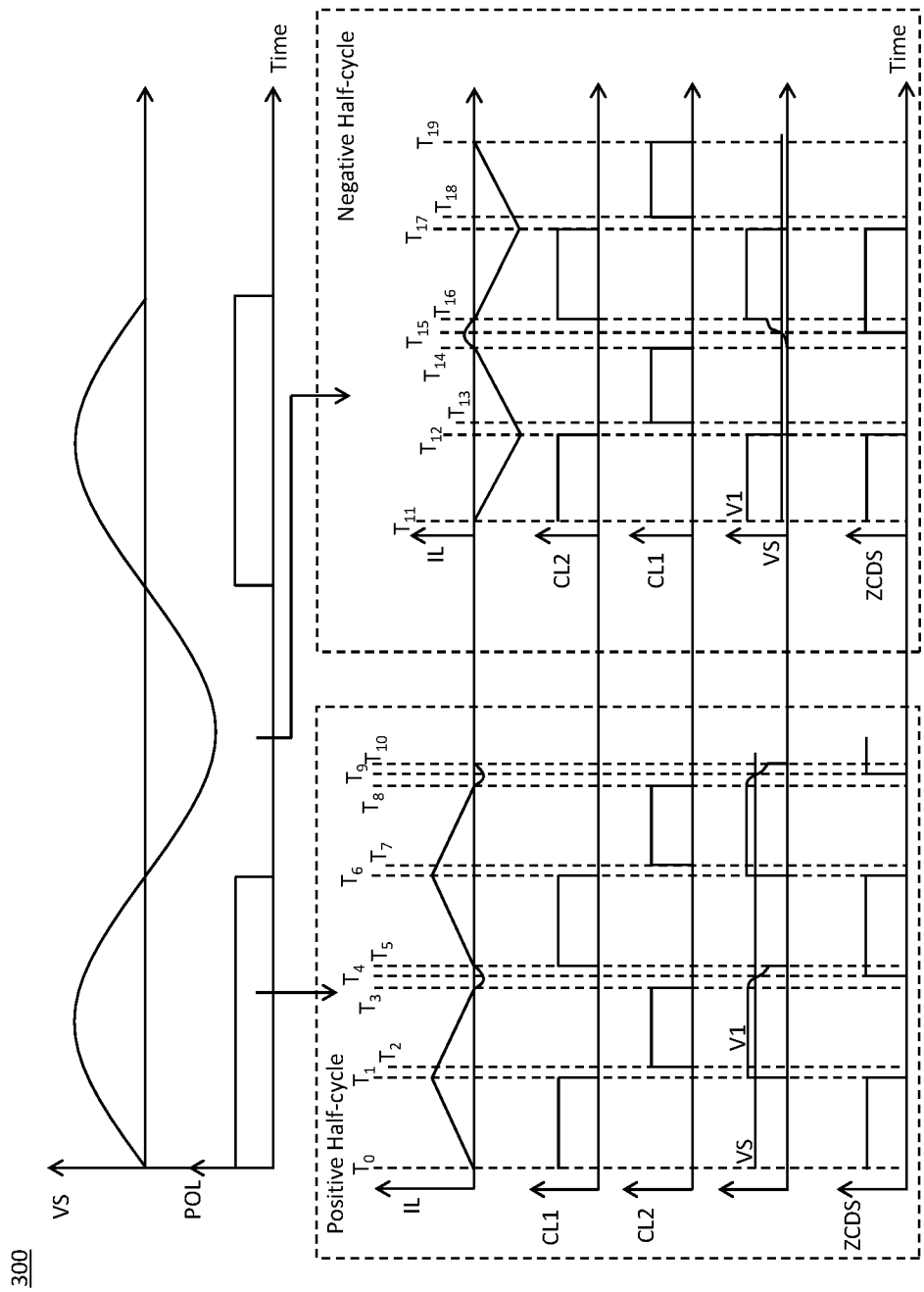
FIG. 3B is a timing diagram illustrating an operation of the ZCD circuit of FIG. 3A in positive and negative half-cycles of a supply voltage in accordance with an embodiment of the present invention.

Referring now to FIG. 3B, a timing diagram 300 illustrating the generation of the ZCD signal ZCDS in the positive and negative half-cycles in accordance with an embodiment of the present invention is shown.

During the positive half-cycle, the polarity detection circuit 106 outputs the polarity signal POL at a logic high state. Further, the processor 112 activates the third control signal CL3 and deactivates the fourth control signal CL4. Thus, the third transistor 214a is activated and the fourth transistor 214b is deactivated. Further, the first transistor 208a functions as an active switch and the second transistor 208b functions as a free-wheeling switch. The inductor current IL passes through the first transistor 208a, the third transistor 214a and the inductor 202 when the inductor 202 is charging, and the second transistor 208b, the first capacitor 218, the load 220, the third transistor 214a, and the inductor 202 when the inductor 202 is discharging.

At time $T_0$, the inductor current IL is at a zero-current value. The first control signal CL1 is activated and the second control signal CL2 is deactivated. Thus, the first transistor 208a is activated and the second transistor 208b is deactivated. Further, the first voltage V1 is at a zero-voltage level and the supply voltage VS is greater than the first voltage V1. Hence, the ZCD circuit 108 asserts the ZCD signal ZCDS.

During time period $T_0$-$T_1$, the first and second control signals CL1 and CL2 remain unchanged. Thus, the inductor 202 charges and the inductor current IL rises from a zero-current value to a first peak value of the inductor current IL. Further, the first voltage V1 remains unchanged at a zero-voltage level and hence the ZCD signal ZCDS remains unchanged at a logic high state.

At time $T_1$, the inductor current IL is at the first peak value. The first control signal CL1 transitions from an active state to an inactive state. Thus, the first transistor 208a is deactivated. Further, the second control signal CL2 remains unchanged. The first voltage V1 rises rapidly from a zero-voltage level to a first voltage level, which is at a voltage level of the second voltage V2 and is greater than the supply voltage VS. Hence, the ZCD signal ZCDS transitions from high to low.

During time period $T_1$-$T_2$, the first and second control signals CL1 and CL2 remain unchanged. Thus, the first and second transistors 208a and 208b remain deactivated. As a result, the inductor 202 starts discharging by way of the second body diode 210b and the inductor current IL starts falling from the first peak value to a first inductor current IL value. Further, the first voltage V1 remains unchanged, i.e., remains greater than the supply voltage VS. Thus, the ZCD signal ZCDS stays low.

At time $T_2$, the inductor current IL is at the first inductor current IL value. The first control signal CL1 remains unchanged. The second control signal CL2 transitions from an inactive state to an active state. Thus, the second transistor 208b is activated after a first dead time (i.e., time period $T_1$-$T_2$) to avoid shorting of the fourth node N4 and ground by having the first and second transistors 208a and 208b activated at the same time. Further, the first voltage V1 remains unchanged, and hence the ZCD signal ZCDS stays low.

During time period $T_2$-$T_3$, the inductor current IL continues dropping until it reaches a zero-current value. The first and second control signals CL1 and CL2 remain unchanged. The first voltage V1 remains unchanged, and hence the ZCD signal ZCDS stays low.

At time $T_3$, the inductor current IL reaches the zero-current value. The first control signal CL1 remains unchanged. The second control signal CL2 transitions from an active state to an inactive state. Thus, the second transistor 208b is deactivated. The inductor 202 and the first and second body capacitors 212a and 212b start resonating. The first voltage V1 remains unchanged, i.e., remains greater than the supply voltage VS, and hence the ZCD signal ZCDS stays low.

During time period $T_3$-$T_4$, the first and second transistors 208a and 208b are deactivated as the first and second control signals CL1 and CL2 remain unchanged. Thus, a reverse current flows through the inductor 202, i.e., the inductor current IL falls below the zero-current value to reach a second peak value of the inductor current IL, and then starts rising. As a result, the first voltage V1 starts falling to a voltage level of the supply voltage VS. The ZCD signal ZCDS remains unchanged at a logic low state.

At time $T_4$, the first and second control signals CL1 and CL2 remain unchanged. Thus, the inductor 202, and the first and second body capacitors 212a and 212b remain in resonance. The inductor current IL is greater than the second peak value and the first voltage V1 is less than the supply voltage VS. Thus, the ZCD signal ZCDS transitions from low to high.

During time period $T_4$-$T_5$, the first and second control signals CL1 and CL2 remain unchanged. Hence, the inductor 202, and the first and second body capacitors 212a and 212b remain in resonance. The inductor current IL continues rising from the second peak value to the zero-current value. Further, the first voltage V1 starts falling below the supply voltage VS to reach a second voltage level. The ZCD signal ZCDS stays high.

At time $T_5$, the inductor current IL reaches the zero-current value and the first control signal CL1 transitions from an inactive state to an active state. Thus, the first transistor 208a is activated after a second dead time (i.e., time period $T_3$-$T_5$) to allow the inductor current IL to reach the zero-current value. The second control signal CL2 remains unchanged. Further, the first voltage V1 reaches the zero-voltage level from the second voltage level. The ZCD signal ZCDS remains unchanged at a logic high state.

The time period $T_0$-$T_5$ represents a first switch cycle. Further, the processor 112 determines an on-time (i.e. duration of time period $T_2$-$T_3$), of the second transistor 208b as explained in FIGS. 5 and 6 hereinafter. It will be apparent to a person skilled in the art that the positive half-cycle may have multiple switch cycles that are similar to the first switch cycle. For example, the time period $T_5$-$T_{10}$ may represent a second switch cycle where the first and second control signals CL1 and CL2, the ZCD signal ZCDS, the inductor current IL, and the first voltage V1 transition in a manner similar to the transitions in the first switch cycle. Further, one switch cycle of the positive and negative half-cycles corresponds to the charging and the subsequent discharging of the inductor 202.

During the negative half-cycle (i.e., time period $T_{11}$-$T_{19}$), the polarity detection circuit 106 outputs the polarity signal POL at a logic low state. Further, the processor 112 outputs the third and fourth control signals CL3 and CL4 at logic low and high states, respectively. Thus, the third transistor 214a is deactivated and the fourth transistor 214b is activated. Further, the second transistor 208b functions as the active switch and the first transistor 208a functions as the free-wheeling switch. It will be apparent to a person skilled in the art that the processor 112 controls the transitions of the first and second control signals CL1 and CL2 in the negative half-cycle in a manner similar to the transitions of the second and first control signals CL2 and CL1 in the positive half-cycle, respectively.

During the negative half-cycle, the operation of the bridgeless PFC system 100 is similar to the operation of the bridgeless PFC system 100 in the positive half-cycle. Further, a polarity of the inductor current IL is reversed and the inductor current IL reaches a third peak value at time $T_{12}$. Further, the inductor current IL passes through the fourth transistor 214b, the second transistor 208b and the inductor 202 when the inductor 202 is charging, and the fourth transistor 214b, the first capacitor 218, the load 220, the first transistor 208a, and the inductor 202 when the inductor 202 is discharging. The ZCD circuit 108 outputs the ZCD signal ZCDS at logic high and low states when the first voltage V1 is greater and less than the supply voltage VS, respectively. Further, the rise of the first voltage V1 from a zero-voltage level to the second voltage level from time instants $T_{14}$-$T_{16}$ is in a manner similar to the fall of the first voltage V1 from the first voltage level to the second voltage level. It will be understood by those of skill in the art that the first voltage V1 remains greater than the supply voltage VS when the second control signal CL2 remains activated, i.e., during time periods $T_{11}$-$T_{12}$ and $T_{16}$-$T_{17}$. Further, the ZCD signal ZCDS transitions from high to low and from low to high at times $T_{11}$-$T_{19}$ in a manner similar to the transition explained above for times $T_0$-$T_{10}$.

Figure 4:
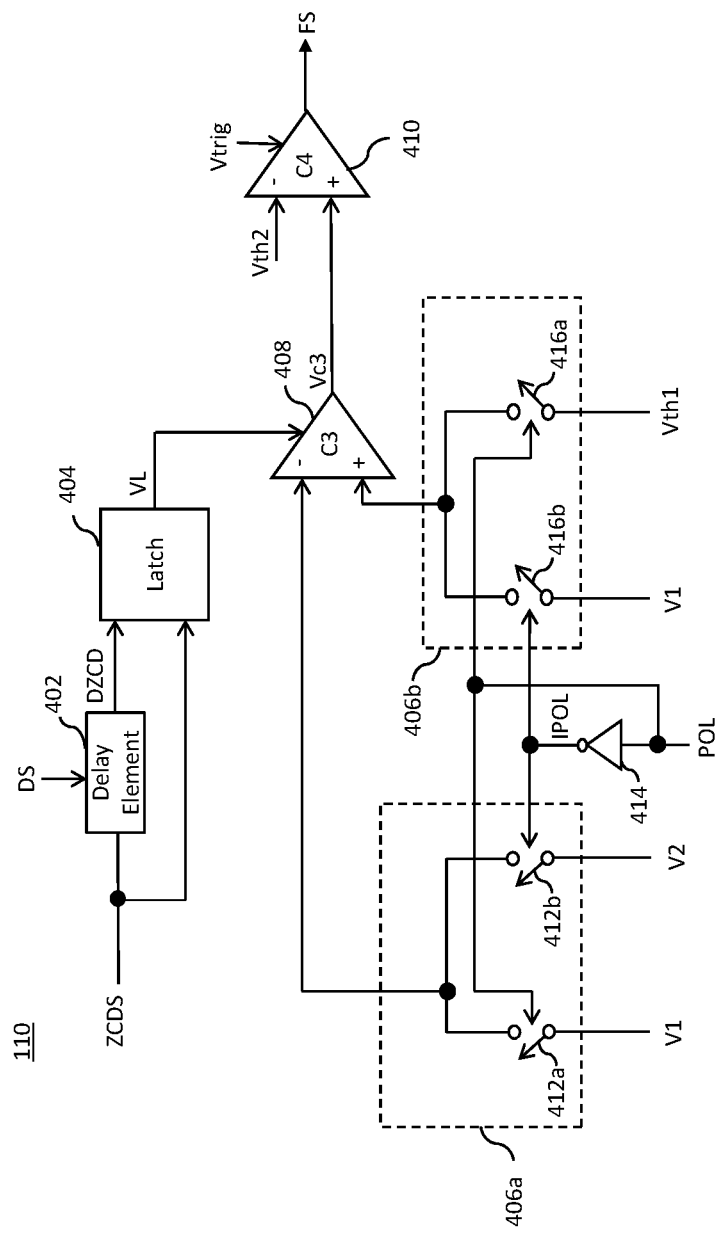
FIG. 4 is a schematic circuit diagram of a zero-voltage switching (ZVS) detection circuit of the CRM bridgeless PFC system of FIG. 1 in accordance with an embodiment of the present invention.

Referring now to FIG. 4, a circuit diagram of the ZVS detection circuit 110 in accordance with an embodiment of the present invention is shown. The ZVS detection circuit 110 includes a delay element 402, a latch 404, second and third selecting circuits 406a and 406b, and third and fourth comparators 408 and 410.

Figure 6:
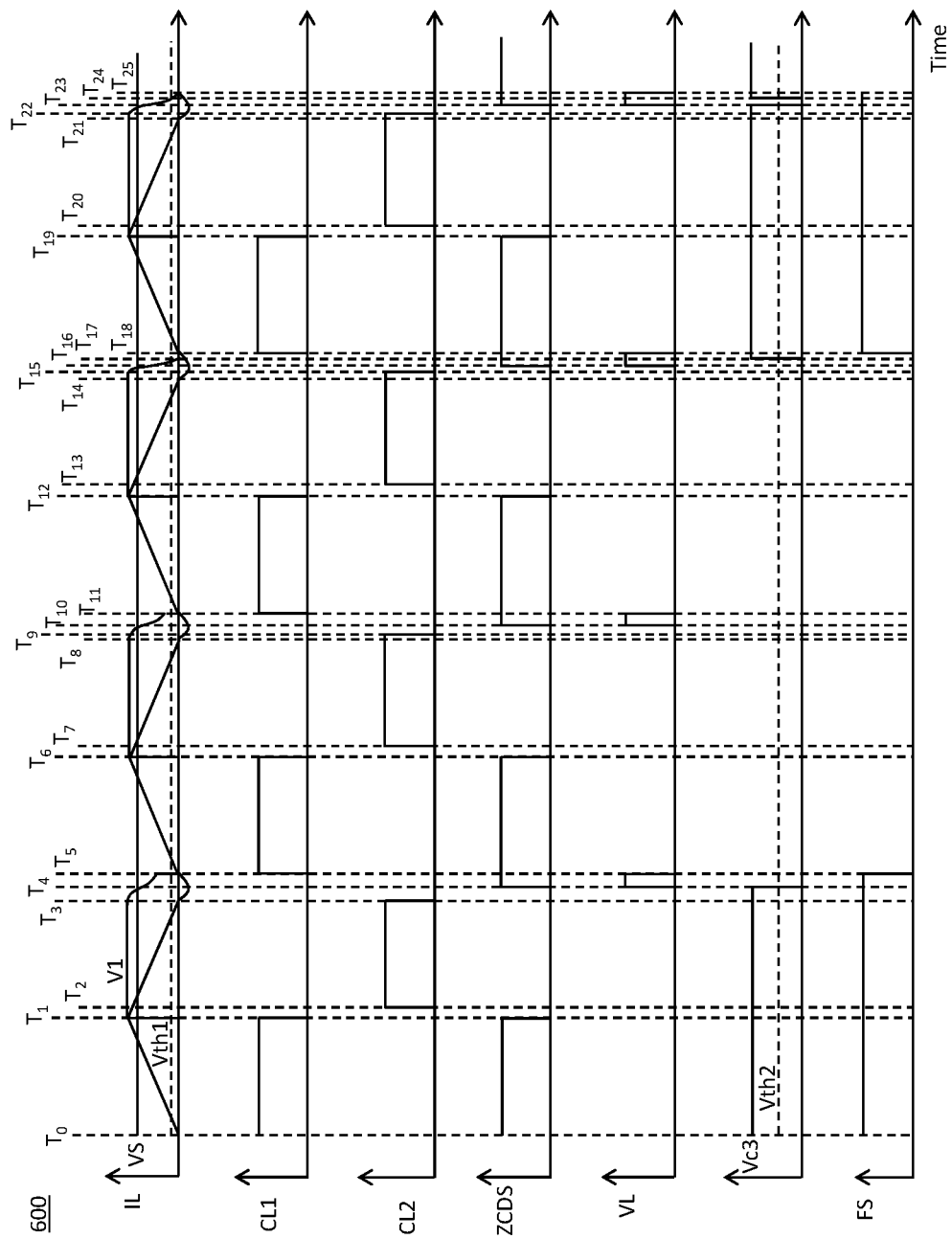
FIG. 6 is a timing diagram illustrating an operation of the CRM bridgeless PFC system in the positive half-cycle in accordance with an embodiment of the present invention.

The delay element 402 is connected to the first selecting circuit 306 for receiving the ZCD signal ZCDS. Further, the delay element 402 is connected to the processor 112 for receiving the delay signal DS. The delay element 402 delays the ZCD signal ZCDS and outputs a delayed version of the ZCD signal ZCDS, hereinafter referred to as delayed ZCD signal DZCD. The delay element 402 thus delays the ZCD signal ZCDS by a first delay value, which is based on the delay signal DS. When the supply voltage VS is greater than one-half of the second voltage V2, the first delay value is a fixed delay value, for example, a constant value of the duration of the time period $T_4$-$T_5$ as shown in FIG. 6. Further, when the supply voltage VS is less than one-half of the second voltage V2, the first delay value is a variable delay value.

The latch 404 has first and second input terminals connected to the first selecting circuit 306 and the delay element 402 for receiving the ZCD signal ZCDS and the delayed ZCD signal DZCD, respectively. The latch 404 outputs a latch output signal VL at a logic high state when the ZCD signal ZCDS and the delayed ZCD signal DZCD are at logic high and low states, respectively. The latch 404 outputs the latch output signal VL at a logic low state when the ZCD signal ZCDS and the delayed ZCD signal DZCD are at logic low and high states, respectively. In one embodiment, the latch 404 is a Set/Reset (SR) latch.

The second selecting circuit 406a includes third and fourth switches 412a and 412b having first terminals that are connected to the bridgeless PFC converter 104 for receiving the first and second voltages V1 and V2, respectively. In one embodiment, the ZVS detection circuit 110 also includes a second logic gate 414 that is connected to the polarity detection circuit 106 for receiving the polarity signal POL and generating/POL. That is, in one embodiment the second logic gate 414 is a NOT gate that receives POL and generates the inverted polarity signal IPOL. In another embodiment, the fourth switch 412b is connected to an output terminal of the first logic gate 318 for receiving the inverted polarity signal IPOL.

The third and fourth switches 412a and 412b have control terminals that are connected to the polarity detection circuit 106 and the second logic gate 414 for receiving POL and IPOL, which control a switching operation of the third and fourth switches 412a and 412b, respectively. Thus, the third and fourth switches 412a and 412b are activated in the positive and negative half-cycles, respectively. Second terminals of the third and fourth switches 412a and 412b are connected together for outputting one of the first and second voltages V1 and V2. When the third and fourth switches 412a and 412b are activated, the second selecting circuit 406a outputs the first and second voltages V1 and V2, respectively.

The third selecting circuit 406b includes fifth and sixth switches 416a and 416b having first terminals that are connected to a threshold generator (not shown) and the PFC converter 104 for receiving the first threshold voltage Vth1 and the first voltage V1, respectively. The first threshold voltage Vth1 is a pre-determined value. The fifth and sixth switches 416a and 416b have control terminals that are connected to the polarity detection circuit 106 and the second logic gate 414 for receiving POL and IPOL, respectively, which control the switching operation of the fifth and sixth switches 416a and 416b, respectively. Thus, the fifth and sixth switches 416a and 416b are activated in the positive and negative half-cycles, respectively. Second terminals of the fifth and sixth switches 416a and 416b are connected together for outputting one of the first threshold voltage Vth1 and the first voltage V1. When the fifth and sixth switches 416a and 416b are activated, the third selecting circuit 406b outputs the first threshold voltage Vth1 and the first voltage V1, respectively.

First and second terminals of the third comparator 408 are non-inverting and inverting terminals, and are connected to the second and third selecting circuits 406a and 406b, respectively. The third comparator 408 also has a control terminal that is connected to the latch 404 for receiving the latch output signal VL. During the positive half-cycle, the third comparator 408 receives the first voltage V1 and the first threshold voltage Vth1 from the second and third selecting circuits 406a and 406b, respectively. During the negative half-cycle, the third comparator 408 receives the second and first voltages V2 and V1 from the second and third selecting circuits 406a and 406b, respectively.

The third comparator 408 outputs a third comparison signal Vc3. During the positive half-cycle, the third comparator 408 outputs the third comparison signal Vc3 at a logic high state when the latch output signal VL is at a logic high state and the first threshold voltage Vth1 is greater than the first voltage V1. The third comparator 408 outputs the third comparison signal Vc3 at a logic low state when the latch output signal VL is high and the first threshold voltage Vth1 is less than the first voltage V1.

During the negative half-cycle, the third comparator 408 outputs the third comparison signal Vc3 at a logic high state when the latch output signal VL is high and the first voltage V1 is greater than the second voltage V2. Further, the third comparator 408 outputs the third comparison signal Vc3 at a logic low state when the latch output signal VL is high and the first voltage V1 is less than the second voltage V2.

The fourth comparator 410 has inverting, non-inverting and control terminals that are connected to the threshold generator, the third comparator 408, and a driver circuit (not shown) for receiving a second threshold voltage Vth2, the third comparison signal Vc3, and a trigger voltage Vtrig, respectively. The second threshold voltage Vth2 is a predetermined value, and is used as a reference signal to determine whether the third comparison signal Vc3 is high or low. During the positive half-cycle, the driver circuit outputs the trigger voltage Vtrig at a logic high state when the first control signal CL1 transitions from an inactive state to an active state. The driver circuit outputs the trigger voltage Vtrig at a logic low state when the first control signal CL1 transitions from an active state to an inactive state. During the negative half-cycle, the driver circuit outputs the trigger voltage Vtrig at a logic high state when the second control signal CL2 transitions from an inactive state to an active state. The driver circuit outputs the trigger voltage Vtrig at a logic low state when the second control signal CL2 transitions from an active state to an inactive state.

The fourth comparator 410 generates the ZVS flag signal FS. The ZVS flag signal FS is indicative of a voltage across the active switches of the PFC converter 104 when the active switches transition from inactive states to active states. Thus, during the positive half-cycle, the ZVS flag signal FS is indicative of the voltage across the first transistor 208a. The ZVS flag signal FS is asserted, i.e., high, when the trigger voltage Vtrig is high, the first voltage V1 is less than the first threshold voltage Vth1, and the ZCD signal ZCDS is activate. The ZVS flag signal FS is de-asserted (i.e., low) when the trigger voltage Vtrig is high and the first voltage V1 is greater than the first threshold voltage Vth1.

During the negative half-cycle, the ZVS flag signal FS is indicative of the voltage across the second transistor 208b. Thus, the ZVS flag signal FS is high when the trigger voltage Vtrig is high, the first voltage V1 is greater than the second voltage V2, and the ZCD signal ZCDS is activate. Further, the ZVS flag signal FS is low when the trigger voltage Vtrig is high and the first voltage V1 is less than the second voltage V2.

Figure 5:
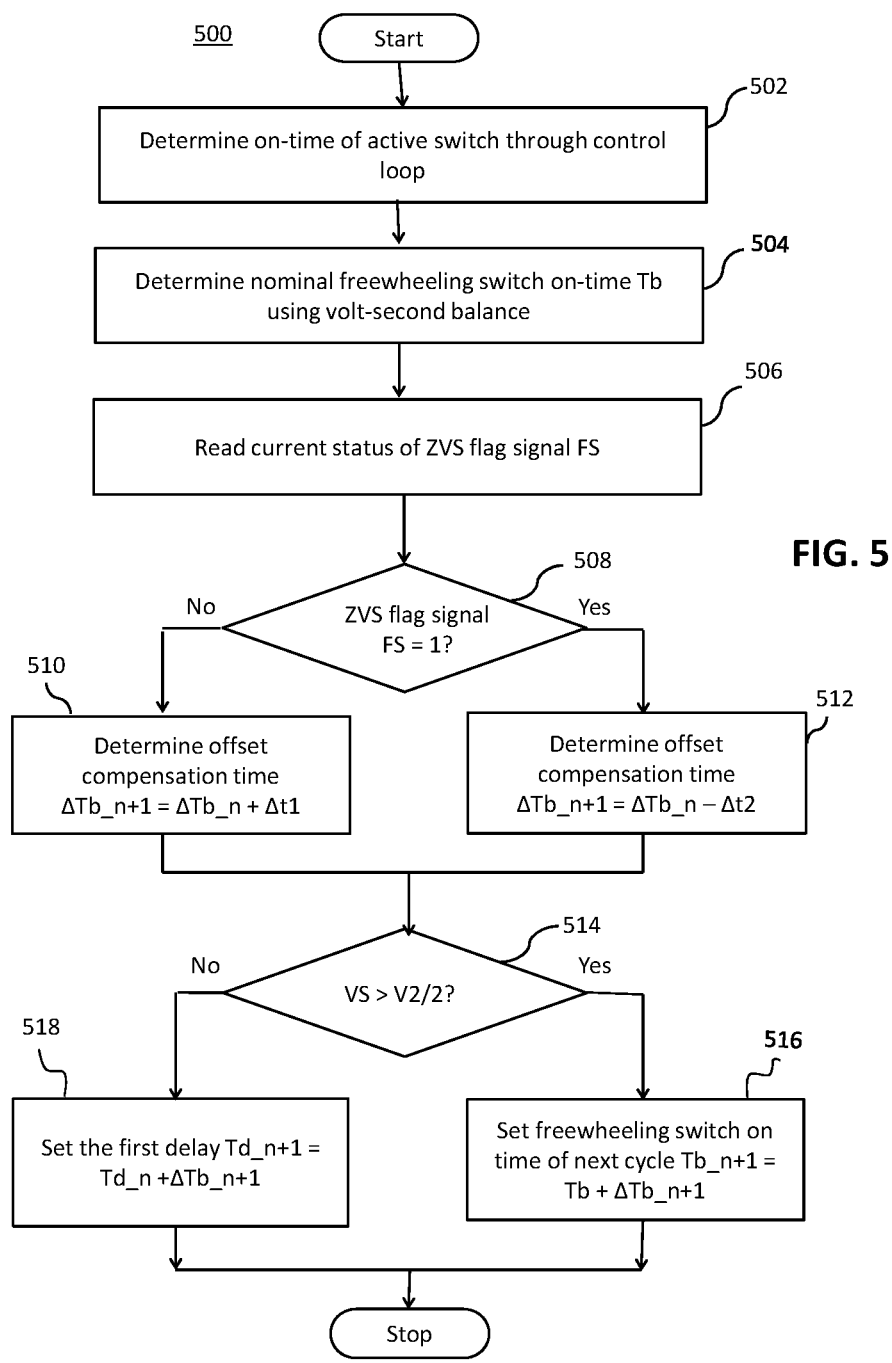
FIG. 5 is a flow chart illustrating an operation of a processor of the CRM bridgeless PFC system of FIG. 1 in accordance with an embodiment of the present invention.

Referring now to FIG. 5, a flow chart 500 illustrating an operation of the processor 112 in accordance with an embodiment of the present invention is shown.

At step 502, the processor 112 determines the on-time of the active switch in the positive and negative half-cycles, i.e., the time period for which the first and second transistors 208a and 208b remain activated, respectively, based on the voltages output in a control loop.

At step 504, the processor 112 determines a nominal on-time Tb of the transistor implementing the free-wheeling switch, i.e., the first and second transistors 208a and 208b in the negative and positive half-cycles, respectively, by way of a volt-second balance relationship of the inductor 202. For example, the nominal on-time of the second transistor 208b, which functions as the free-wheeling switch, is from time $T_2$-$T_3$ (see FIG. 6).

At step 506, the processor 112 checks the current status of the ZVS flag signal FS (i.e., the processor 112 reads the current logic state of the ZVS flag signal FS) by way of the ZVS detection circuit 110. The current status is a value that indicates a current voltage level of the first voltage V1 across the transistor functioning as the active switch when the active switch transitions from an inactive state to an active state in the current switch cycle.

At step 508, the processor 112 determines whether the ZVS flag signal FS is at a logic high state. If no (ZVS flag signal FS is low), then step 510 is performed, and if yes (ZVS flag signal FS is high), then step 512 is performed.

At step 510, the processor 112 determines an offset compensation time ΔTb_n+1 for offsetting the nominal on-time Tb of the free-wheeling switch in a next switch cycle (such as the second switch cycle in FIG. 6). The offset compensation time ΔTb_n+1 is determined based on the current compensation time, i.e., ΔTb_n, of the free-wheeling switch in the current switch cycle (such as the first switch cycle in FIG. 6) using equation (1):

$$\Delta Tb\_n+1 = \Delta Tb\_n + \Delta t1 \quad (1)$$

where,

Δt1 is a first offset value determined by the processor 112. For example, a difference between time period $T_2$-$T_3$ (as shown in FIG. 6) and time period $T_7$-$T_9$ (see FIG. 6) is the first offset value Δt1. The first offset value is used to vary the offset compensation time. In the example, the time period $T_8$-$T_9$ (see FIG. 6) is the current compensation time ΔTb_n, and time period $T_{14}$-$T_{15}$ (see FIG. 6) is the offset compensation time ΔTb_n+1 that is determined using equation (1).

Alternatively, at step 512, the processor 112 determines the offset compensation time for the next switch cycle based on the current compensation time using equation (2):

$$\Delta Tb\_n+1 = \Delta Tb\_n - \Delta t2 \quad (2)$$

where,

Δt2 is a second offset value determined by the processor 112. For example, a difference between time period $T_{14}$-$T_{15}$ (FIG. 6) and time period $T_{21}$-$T_{22}$ (FIG. 6) is the second offset value Δt2. The second offset value is used to vary the offset compensation time. In the example, time period $T_{14}$-$T_{15}$ (FIG. 6) is the current compensation time ΔTb_n and time period $T_{21}$-$T_{22}$ (FIG. 6) is the offset compensation time ΔTb_n+1 determined using equation (2).

Both of steps 510 and 512 next perform step 514. At step 514, the processor 112 determines whether the supply voltage VS is greater than one-half of the second voltage V2. If at step 514, the processor 112 determines that the supply voltage VS is greater than one-half of the second voltage V2, step 516 is performed, and if no, step 518 is performed.

At step 516, the processor 112 sets an on-time Tb_n+1 of the free-wheeling switch for the next switch cycle, for example, the on-time of the second transistor 208b in the positive half-cycle, using equation (3):

$$Tb\_n+1 = Tb + \Delta Tb\_n+1 \quad (3)$$

where,

Tb is the nominal on-time of the free-wheeling switch, and

ΔTb_n+1 is the offset compensation time determined by the processor 112. For example, time period $T_{13}$-$T_{15}$ (FIG. 6) is the current on-time Tb_n of the free-wheeling switch, i.e., the second transistor 208b, and time period $T_{20}$-$T_{22}$ (FIG. 6) is the on-time Tb_n+1 of the second transistor 208b that is varied based on equation (3).

If at step 514, the processor 112 determines that the supply voltage VS is less than one-half of the second voltage V2, step 518 is performed. At step 518, the processor 112 sets the first delay value for the next switch cycle (designated as "Td_n+1") using equation (4):

$$Td\_n+1 = Td\_n + \Delta Tb\_n+1 \qquad (4)$$

where,

Td_n is the current first delay value, and $\Delta$Tb_n+1 is the offset compensation time determined by the processor 112.

Time period $T_4$-$T_5$ (see FIG. 6) is the current first delay value (i.e., Td_n), and time period $T_{10}$-$T_{11}$ (FIG. 6) is the first delay value for the next switch cycle (i.e., Td_n+1) and is varied based on equation (4).

When the supply voltage VS is less than one-half of the second voltage V2, the processor 112 varies the first delay value of the delay element 402. Thus, when the second transistor 208b is deactivated during the positive half-cycle, the first transistor 208a is activated when the first time duration lapses after the ZCD signal ZCDS is activated. Similarly, when the first transistor 208a is deactivated during the negative half-cycle, the second transistor 208b is activated when a second time duration lapses after the ZCD signal ZCDS is deactivated. During the positive and negative half-cycles, the first and second time durations correspond to the first delay value.

Referring now to FIG. 6, a timing diagram 600 illustrating an operation of the bridgeless PFC system 100 in the positive half-cycle, in accordance with an embodiment of the present invention, is shown. In the positive half-cycle, the polarity detection circuit 106 outputs the polarity signal POL at a logic high state. The processor 112 also outputs the third control signal CL3 at a logic high state and the fourth control signal CL4 at a logic low state. Thus, the third transistor 214a is activated and the fourth transistor 214b is deactivated. The first transistor 208a functions as the active switch and the second transistor 208b functions as the free-wheeling switch.

At time $T_0$, the inductor current IL is at a zero-current value. Further, the first and second control signals CL1 and CL2 are activated and deactivated, respectively. Thus, the first and second transistors 208a and 208b are activated and deactivated, respectively. The first voltage V1 is less than the first threshold voltage Vth1. Further, the ZCD signal ZCDS is at a logic high state, and the latch output signal VL is at a logic low state. The third comparison signal Vc3 and the ZVS flag signal FS are at logic high states.

During time period $T_0$-$T_1$, the inductor current IL rises from the zero-current value to the first peak value, thereby charging the inductor 202. The first and second control signals CL1 and CL2 and the ZCD signal ZCDS remain unchanged. The latch output signal VL also remains unchanged at a logic low state as the ZCD signal ZCDS and the delayed ZCD signal DZCD are both high. Thus, the third comparison signal Vc3 remains unchanged at a logic high state, i.e., remains greater than the second threshold voltage Vth2. Hence, the ZVS flag signal FS remains unchanged at a logic high state.

At time $T_1$, the inductor current IL is at the first peak value. The first control signal CL1 transitions from an active state to an inactive state, thereby deactivating the first transistor 208a. Hence, time period $T_0$-$T_1$ corresponds to the on-time of the first transistor 208a. The second control signal CL2 remains unchanged, thus, the second transistor 208b remains deactivated. When the first transistor 208a is deactivated, the inductor 202, and the first and second body capacitors 212a and 212b start resonating, and the first voltage V1 rises rapidly from a zero-voltage level to the first voltage level, i.e., the voltage level of the second voltage V2. Further, the inductor 202 starts discharging by way of the second body diode 210b when the first voltage V1 is at the voltage level of the second voltage V2. The first voltage V1 is greater than the supply voltage VS, and thus the ZCD signal ZCDS goes from high to low. Further, the latch output signal VL remains unchanged at a logic low state. Thus, the third comparison signal Vc3 and the ZVS flag signal FS remain unchanged at logic high states.

During time period $T_1$-$T_2$, the first control signal CL1 and the second control signal CL2 remain unchanged, and thus the first and second transistors 208a and 208b remain deactivated. Thus, the inductor 202 starts discharging by way of the second body diode 210b and the inductor current IL starts falling from the first peak value to reach the first inductor current IL value. The first voltage V1 remains unchanged, i.e., remains greater than the supply voltage VS. Thus, the ZCD signal ZCDS and the latch output signal VL remain unchanged at logic low states, and the third comparison signal Vc3 and the ZVS flag signal FS remain unchanged at logic high states.

At time $T_2$, the second control signal CL2 transitions from an inactive state to an active state. Thus, the second transistor 208b is activated after the first dead time. The first control signal CL1 remains unchanged. The inductor current IL is at the first inductor current IL value. The first voltage V1 remains unchanged, i.e., remains greater than the supply voltage VS. Thus, the ZCD signal ZCDS and the latch output signal VL remain unchanged at logic low states, and the third comparison signal Vc3 and the ZVS flag signal FS remain unchanged at logic high states.

During time period $T_2$-$T_3$, the inductor current IL continues dropping until it reaches the zero-current value, thereby discharging the inductor 202. The first and second control signals CL1 and CL2 and the first voltage V1 remain unchanged. As a result, and the ZCD signal ZCDS and the latch output signal VL remain unchanged at logic low states, and the third comparison signal Vc3 and the ZVS flag signal FS remain unchanged at logic high states.

At time $T_3$, the first control signal CL1 remains unchanged and the second control signal CL2 transitions from an active state to an inactive state. Thus, the second transistor 208b is deactivated. Hence, time period $T_2$-$T_3$ corresponds to the on-time of the second transistor 208b. Further, the inductor 202, and the first and second body capacitors 212a and 212b start resonating. The inductor current IL reaches the zero-current value and the first voltage V1 remains greater than the supply voltage VS. As a result, the ZCD signal ZCDS and the latch output signal VL remain unchanged at logic low states, and the third comparison signal Vc3 and the ZVS flag signal FS remain unchanged at logic high states.

During time period $T_3$-$T_4$, the first and second transistors 208a and 208b are deactivated as the first and second control signals CL1 and CL2 remain unchanged. Thus, the reverse current flows through the inductor 202, i.e., the inductor current IL falls below the zero-current value to reach a second peak value, and then starts rising. Further, the first voltage V1 starts falling to a voltage level of the supply voltage VS. The ZCD signal ZCDS and the latch output signal VL remain unchanged at logic low states. The third comparison signal Vc3 and the ZVS flag signal FS remain unchanged at logic high states.

At time $T_4$, the first and second control signals CL1 and CL2 remain unchanged. Thus, the inductor 202, and the first and second body capacitors 212a and 212b remain in resonance. The inductor current IL is greater than the second peak value and the first voltage V1 is less than the supply voltage VS. The ZCD signal ZCDS transitions from low to high. Thus, the latch output signal VL transitions from low to high. Further, the third comparison signal Vc3 transitions from a high to low (i.e., a voltage level of the third comparison signal Vc3 falls below the second threshold voltage Vth2). The ZVS flag signal FS remains unchanged at a logic high state as the trigger voltage Vtrig is at a logic low state.

During time period $T_4$-$T_5$, the first and second control signals CL1 and CL2 remain unchanged. Thus, the inductor 202, and the first and second body capacitors 212a and 212b remain in resonance. Hence, the inductor current IL continues to rise to the zero-current value, and the first voltage V1 continues to fall and is less than the supply voltage VS. The ZCD signal ZCDS and the latch output signal VL remain unchanged at logic high states. The third comparison signal Vc3 remains unchanged at a logic low state, and the ZVS flag signal FS remains unchanged at a logic high state.

At time $T_5$, the inductor current IL reaches the zero-current value. Further, the first control signal CL1 transitions from an inactive state to an active state, thus, activating the first transistor 208a after the second dead time. The second control signal CL2 remains unchanged. The first voltage V1 falls to the zero-voltage level. The ZCD signal ZCDS remains unchanged at a logic high state. The latch output signal VL transitions from a logic high state to a logic low state (as the delayed ZCD signal DZCD transitions from a logic low state to a logic high state due to the delay value that equals the time period $T_4$-$T_5$). The third comparison signal Vc3 remains unchanged at a logic low state. As a voltage level of the third comparison signal Vc3 is less than the second threshold voltage Vth2, the ZVS flag signal FS goes from high to low.

The time period $T_0$-$T_5$ is a first switch cycle. Based on the ZVS flag signal FS at time $T_5$ and the first through third equations (1)-(3), the processor 112 sets the on-time of the second transistor 208b for a next switch cycle $T_5$-$T_{11}$.

The inductor current IL, the first control signal CL1, the ZCD signal ZCDS, and the latch output signal VL vary periodically during time periods $T_5$-$T_{11}$, $T_{11}$-$T_{18}$, and $T_{18}$-$T_{25}$ in a manner as explained in the first switch cycles $T_0$-$T_5$. The on-time of the second control signal CL2 varies based on the ZVS flag signal FS. Thus, the second transistor 208b is deactivated at times $T_9$, $T_{15}$, and $T_{22}$ based on the ZVS flag signal FS as explained above with reference to FIG. 5.

The ZVS flag signal FS goes low at time $T_5$ in the first switch cycle $T_0$-$T_5$. Thus, the processor 112 increases the on-time of the second transistor 208b based on the equations (1) and (3) in the second switch cycle $T_5$-$T_{12}$ as explained above with reference to FIG. 5. At time $T_8$, the inductor current IL falls to the zero-current value, however, the second control signal CL2 remains activated. Thus, the second transistor 208b remains activated. During time period $T_8$-$T_9$, the inductor current IL falls below the zero-current value, and the first and second control signals CL1 and CL2, the ZCD signal ZCDS, and the third comparison signal Vc3 remain unchanged.

At time $T_9$, the second control signal CL2 transitions from an active state to an inactive state, thereby deactivating the second transistor 208b. The inductor 202, and the first and second body capacitors 212a and 212b start resonating. Thus, the reverse current flows through the inductor 202, i.e., the inductor current IL falls below the zero-current value. Thus, the first voltage V1 falls to a voltage level closer to the first threshold voltage Vth1.

The ZVS flag signal FS remains unchanged at a logic low state in the second switch cycle $T_5$-$T_{11}$. Thus, the processor 112 increase the on-time of the second transistor 208b based on equations (1) and (3) in the third switch cycle $T_{11}$-$T_{18}$ as discussed above. At time $T_{14}$, the inductor current IL falls to the zero-current value, however, the second control signal CL2 remains activated. Thus, the second transistor 208b remains activated. During time period $T_{14}$-$T_{15}$, the inductor current IL falls below the zero-current value and the first and second control signals CL1 and CL2, the ZCD signal ZCDS, and the third comparison signal Vc3 remain unchanged.

At time $T_{15}$, the second control signal CL2 transitions from an active state to an inactive state, thus, deactivating the second transistor 208b. The offset compensation time $T_{14}$-$T_{15}$ in the third switch cycle $T_{11}$-$T_{18}$ is larger than the offset compensation time $T_8$-$T_9$ in the second switch cycle $T_5$-$T_{11}$. Thus, the first voltage V1 is less than the first threshold voltage Vth1 at the time instance $T_{17}$. Further, the latch output signal VL is at a logic high state. Thus, the third comparison signal Vc3 transitions from a logic low state to a logic high state.

At time $T_{18}$, the first control signal CL1 transitions from an inactive state to an active state, thus, activating the first transistor 208a. Further, the third comparison signal Vc3 is greater than the second threshold voltage Vth2, and thus the ZVS flag signal FS transitions from a logic low state to a logic high state.

The ZVS flag signal FS transitions to a logic high state at the time $T_{18}$ in third switch cycle $T_{11}$-$T_{18}$. Thus, the processor 112 decreases the on-time of the second transistor 208b based on the equations (2) and (3) in the fourth switch cycle $T_{18}$-$T_{25}$ as previously explained. At time $T_{21}$, the inductor current IL falls to the zero-current value, however, the second control signal CL2 remains activated. Thus, the second transistor 208b remains activated. During time period $T_{21}$-$T_{22}$, the inductor current IL falls below the zero-current value and the first and second control signals CL1 and CL2, the ZCD signal ZCDS, and the third comparison signal Vc3 remain unchanged.

At time $T_{22}$, the second control signal CL2 transitions from an active state to an inactive state, thus, deactivating the second transistor 208b. The offset compensation time $T_{21}$-$T_{22}$ in the fourth switch cycle $T_{18}$-$T_{25}$ is less than the offset compensation time $T_{14}$-$T_{15}$ in the third switch cycle $T_{11}$-$T_{18}$. This enables the first voltage V1 to drop to the zero-voltage level at a time that is closer to time $T_{25}$ when the first transistor 208a is activated.

The ZCD circuit 108 uses configurable comparators (i.e., the first and second comparators 304a and 304b) and sampling circuitry (not shown) of the ZVS detection circuit 110. Thus, the need for separate sampling circuitry to sample the first and supply voltages V1 and VS is eliminated. Further, the sampling of the first and supply voltages V1 and VS by the ZVS detection circuit 110 ensures that the first voltage V1 and the supply voltage VS remain at positive voltage levels in the positive and negative half-cycles. Hence, the need for a rectifier circuit in the bridgeless PFC system 100 is eliminated. Thus, absence of the separate sampling circuitry and the rectifier circuit reduces the area occupied by the ZCD circuit 108. Additionally, the area and cost of the bridgeless PFC system 100 is less than that of conventional bridgeless PFC systems because the ZCD circuits requires less area.

The processor 112 outputs the first and second control signals CL1 and CL2 based on the detection of the zero-current state by the ZCD circuit 108 in real-time without additional circuitry (such as current transformer sensors to detect the zero-current state). Thus, the power consumed by the bridgeless PFC system 100 is less than for conventional bridgeless PFC systems that require additional circuitry for detecting the zero-current state. In addition, the ZCD signal ZCDS acts as a timing control signal for the generation of the ZVS flag signal FS in real-time, thereby leading to better accuracy and reliability.

It will be understood by those of skill in the art that the same functions may be performed by different arrangements of transistors that may operate using either high active or low active signals. Therefore, variations in the arrangement of some of the transistors described above should not be considered to depart from the scope of the present invention. In describing transistors, the terms gate, drain and source are used interchangeably with the respective terms "gate terminal", "drain terminal" and "source terminal".

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A critical conduction mode (CRM) bridgeless power factor correction (PFC) system, comprising:
a bridgeless PFC converter that receives a supply voltage and outputs first and second voltages;
a zero-current detection (ZCD) circuit connected to the bridgeless PFC converter for receiving the first voltage, the ZCD circuit comprising:
a first voltage divider circuit that receives the supply voltage and outputs a third voltage;
a second voltage divider circuit that receives the first voltage and outputs a fourth voltage;
first and second comparators connected to the first and second voltage divider circuits for receiving the third and fourth voltages and outputting respective first and second comparison signals; and
a first selecting circuit connected to the first and second comparators for receiving the first and second comparison signals, respectively, and outputting a ZCD signal, wherein the ZCD signal is indicative of a zero-current state of the bridgeless PFC converter;
a zero-voltage switching (ZVS) detection circuit connected to the bridgeless PFC converter for receiving the first and second voltages and connected to the ZCD circuit for receiving the ZCD signal, wherein the ZVS detection circuit outputs a ZVS flag signal; and
a processor connected to the ZCD circuit and the ZVS detection circuit for receiving the ZCD signal and the ZVS flag signal, respectively, and connected to the bridgeless PFC converter for receiving the first and second voltages, wherein the processor outputs a set of control signals for controlling the bridgeless PFC converter.

2. The CRM bridgeless PFC system of claim 1, wherein:
the first voltage divider circuit includes a first plurality of resistors and a first voltage tap for outputting the third voltage, and
the second voltage divider circuit includes a second plurality of resistors and a second voltage tap for outputting the fourth voltage.

3. The CRM bridgeless PFC system of claim 1, further comprising a polarity detection circuit that receives the supply voltage and generates a polarity signal that is indicative of positive and negative half-cycles of the supply voltage, and wherein the set of control signals is output based on the polarity signal.

4. The CRM bridgeless PFC system of claim 3, wherein the first selecting circuit includes:
a first switch having connected to the first comparator for receiving the first comparison signal; and
a second switch connected to the second comparator for receiving the second comparison signal, wherein output terminals of the first and second switches are connected together and provide the ZCD signal, and wherein the first and second switches are controlled by the polarity signal.

5. The CRM bridgeless PFC system of claim 4, wherein:
the first and second switches are activated in the positive and negative half-cycles of the supply voltage, respectively,
when the first switch is activated, the first selecting circuit outputs the first comparison signal as the ZCD signal, and
when the second switch is activated, the first selecting circuit outputs the second comparison signal as the ZCD signal.

6. The CRM bridgeless PFC system of claim 3, wherein the ZVS detection circuit comprises:
a delay element that receives the ZCD signal and outputs a delayed version of the ZCD signal;
a latch that receives the ZCD signal and the delayed version of the ZCD signal, respectively, and outputs a latch output signal;
a second selecting circuit that receives the first voltage and a first threshold voltage and outputs one of the first voltage and the first threshold voltage based on the polarity signal;
a third selecting circuit that receives the first and second voltages and outputs one of the first and second voltages based on the polarity signal;
a third comparator connected to the second selecting circuit for receiving one of the first voltage and the first threshold voltage, the third selecting circuit for receiving one of the first and second voltages, and the latch for receiving the latch output signal, wherein the third comparator outputs a third comparison signal; and
a fourth comparator that compares the third comparison signal with a second threshold voltage to generate the ZVS flag signal.

7. The CRM bridgeless PFC system of claim 1, wherein the bridgeless PFC converter comprises:
a first bridge arm that includes first and second series connected transistors having a first node located therebetween;
a second bridge arm that includes third and fourth series connected transistors having a second node located therebetween, wherein the second bridge arm is connected to the first bridge arm in parallel such that the third transistor is connected to the first transistor at a third node, and the fourth transistor is connected to the second transistor at a fourth node, wherein the second voltage is output at the fourth node, and wherein the first through fourth transistors are controlled by the set of control signals; and
an inductor having a first terminal for receiving the supply voltage and a second terminal connected to the first node for outputting the first voltage.

8. The CRM bridgeless PFC system of claim 7, wherein during a positive half-cycle of the supply voltage:
the first and third transistors are activated and the second and fourth transistors are deactivated when the inductor is charging, and
the second and third transistors are activated and the first and fourth transistors are deactivated when the inductor is discharging.

9. The CRM bridgeless PFC system of claim 8, wherein during a negative half-cycle of the supply voltage:
the second and fourth transistors are activated and the first and third transistors are deactivated when the inductor is charging, and
the first and fourth transistors are activated and the second and third transistors are deactivated when the inductor is discharging.

10. The CRM bridgeless PFC system of claim 9, wherein:
during the positive half-cycle, the ZVS flag signal is activated when the ZCD signal is activated, the first voltage is less than a first threshold voltage, and the first transistor is activated, and
during the negative half-cycle, the ZVS flag signal is activated when the ZCD signal is activated, the first voltage is greater than the second voltage, and the second transistor is activated.

11. The CRM bridgeless PFC system of claim 9, wherein the processor determines an on-time of the second transistor during each switch cycle of the positive half-cycle, and an on-time of the first transistor during each switch cycle of the negative half-cycle based on a volt-second balance of the inductor, and wherein a switch cycle of the positive and negative half-cycles corresponds to the charging and the subsequent discharging of the inductor.

12. The CRM bridgeless PFC system of claim 11, wherein when the supply voltage is greater than one-half of the second voltage, the on-time of the second transistor and the on-time of the first transistor are further determined based on the ZVS flag signal.

13. The CRM bridgeless PFC system of claim 11, wherein:
the first transistor is activated after a first time duration when the second transistor is deactivated during the positive half-cycle,
the second transistor is activated after a second time duration when the first transistor is deactivated during the negative half-cycle,
when the supply voltage is less than one-half of the second voltage, the first and second time durations vary for each switch cycle of the positive and negative half-cycles, respectively, and
when the supply voltage is greater than one-half of the second voltage, the first and second time durations are constant for each switch cycle of the positive and negative half-cycles, respectively.

14. The CRM bridgeless PFC system of claim 1, wherein:
during a positive half-cycle of the supply voltage, the ZCD signal is activated when the first voltage is less than the supply voltage, and
during a negative half-cycle of the supply voltage, the ZCD signal is activated when the first voltage is greater than the supply voltage.

15. A zero-current detection (ZCD) circuit for a bridgeless Power Factor Correction (PFC) converter, the ZCD circuit comprising: a first voltage divider circuit that receives a supply voltage and outputs a first voltage;
a second voltage divider circuit connected to the bridgeless PFC converter for receiving a second voltage and outputting a third voltage;
first and second comparators connected to the first and second voltage divider circuits for receiving the first and third voltages, and outputting respective first and second comparison signals; and
a selecting circuit connected to the first and second comparators for receiving the first and second comparison signals and outputting a ZCD signal indicative of a zero-current state of the bridgeless PFC converter,
wherein the selecting circuit includes:
a first switch having an input terminal connected to the first comparator for receiving the first comparison signal; and
a second switch having an input terminal connected to the second comparator for receiving the second comparison signal, wherein output terminals of the first and second switches are connected together and provide the ZCD signal, and wherein the first and second switches are controlled by a polarity signal.

16. The ZCD circuit of claim 15, wherein:
the first voltage divider circuit includes a first plurality of resistors and a first voltage tap for outputting the first voltage, and
the second voltage divider circuit includes a second plurality of resistors and a second voltage tap for outputting the third voltage.

17. The ZCD circuit of claim 15, wherein the selecting circuit is connected to a polarity detection circuit for receiving the polarity signal therefrom, and wherein the polarity signal is indicative of positive and negative half-cycles of the supply voltage.

18. The ZCD circuit of claim 15, wherein: the first and second switches are activated in the positive and negative half-cycles of the supply voltage, respectively, when the first switch is activated, the selecting circuit outputs the first comparison signal as the ZCD signal, and when the second switch is activated, the selecting circuit outputs the second comparison signal as the ZCD signal.

19. The ZCD circuit of claim 15, wherein:
during a positive half-cycle of the supply voltage, the ZCD signal is activated when the second voltage is less than the supply voltage, and
during a negative half-cycle of the supply voltage, the ZCD signal is activated when the second voltage is greater than the supply voltage.

* * * * *